(12) United States Patent
Saint-Jalmes (10) Patent No.: US 7,275,716 B2
(45) Date of Patent: Oct. 2, 2007

(54) AIRCRAFT CABIN MODULE

(75) Inventor: Bruno Saint-Jalmes, Toulouse (FR)

(73) Assignee: Airbus, Blagnac (FR)

( * ) Notice: Subject to any disclaimer, the term of this patent is extended or adjusted under 35 U.S.C. 154(b) by 10 days.

(21) Appl. No.: 10/477,614

(22) PCT Filed: Jul. 15, 2003

(86) PCT No.: PCT/FR03/02229

§ 371 (c)(1),
(2), (4) Date: Jul. 20, 2004

(87) PCT Pub. No.: WO2004/009443

PCT Pub. Date: Jan. 29, 2004

(65) Prior Publication Data

US 2005/0023413 A1    Feb. 3, 2005

(30) Foreign Application Priority Data

Jul. 19, 2002 (FR) .................................. 02 09181

(51) Int. Cl.
*B64D 11/06* (2006.01)
(52) U.S. Cl. .................. 244/118.6; 244/129.1
(58) Field of Classification Search ............ 244/118.5, 244/118.6, 118.1, 118.2, 137.1, 129.1, 129.3; 144/71; 296/63, 64, 65, 69, 156, 169, 170, 296/178; 349/16; 105/315
See application file for complete search history.

(56) References Cited

U.S. PATENT DOCUMENTS

| | | | | |
|---|---|---|---|---|
| 1,731,531 A | | 10/1929 | Gott | |
| 2,092,655 A | * | 9/1937 | Page, Jr. .................. | 244/118.6 |
| 2,147,011 A | * | 2/1939 | Crawford .................... | 105/315 |
| 2,208,683 A | * | 7/1940 | Page, Jr. .................. | 244/118.6 |
| 2,309,665 A | | 2/1943 | Parke | |
| 2,364,595 A | * | 12/1944 | Tully et al. ................. | 105/315 |
| 2,485,078 A | * | 10/1949 | Watter ......................... | 105/315 |
| 2,531,687 A | * | 11/1950 | Jones .......................... | 105/315 |
| 2,556,140 A | * | 6/1951 | Lyon ........................... | 105/315 |
| 2,561,630 A | * | 7/1951 | Murphy et al. ............. | 105/315 |
| 2,583,960 A | * | 1/1952 | Murphy ....................... | 105/315 |
| 2,590,045 A | * | 3/1952 | Schiff .......................... | 105/315 |
| 2,608,366 A | * | 8/1952 | Jergenson ................ | 244/118.6 |
| 2,641,201 A | * | 6/1953 | Sampson et al. ........... | 105/315 |
| 2,681,016 A | * | 6/1954 | Candlin, Jr. ................ | 105/315 |
| 2,760,443 A | * | 8/1956 | Gobrecht .................... | 105/315 |
| 2,946,294 A | * | 7/1960 | Murphy ...................... | 105/315 |
| 2,953,103 A | * | 9/1960 | Bohannon et al. .......... | 105/315 |

(Continued)

FOREIGN PATENT DOCUMENTS

DE      18 11 637      6/1970

(Continued)

*Primary Examiner*—Timothy D. Collins
(74) *Attorney, Agent, or Firm*—Oblon, Spivak, McClelland, Maier & Neustadt, P.C.

(57) ABSTRACT

An aircraft cabin module of an elongated rectangular shape and that includes two large walls connected by two small walls, a service module arranged along a wall separating the module from an aisle, a door mounted in an opening implemented in a small wall, and at least one seat having at least one configuration in which it is positioned longitudinally in relation to the direction of movement of the airplane. Each module includes elements configured to form a bedding surface for at least one passenger.

27 Claims, 5 Drawing Sheets

U.S. PATENT DOCUMENTS

| | | | |
|---|---|---|---|
| 2,960,292 A * | 11/1960 | Pitta | 244/118.5 |
| 3,521,941 A * | 7/1970 | Deb et al. | 359/275 |
| 3,898,701 A * | 8/1975 | Gallaher et al. | 5/2.1 |
| 4,100,857 A * | 7/1978 | Gutridge et al. | 105/323 |
| 4,645,145 A * | 2/1987 | Alie | 244/118.5 |
| 4,884,767 A * | 12/1989 | Shibata | 244/118.5 |
| 5,024,398 A | 6/1991 | Riedinger et al. | |
| 5,150,863 A * | 9/1992 | Hozumi | 244/118.5 |
| 5,159,994 A * | 11/1992 | Luria | 186/40 |
| 5,259,575 A * | 11/1993 | Cabrera | 244/118.5 |
| 5,474,260 A * | 12/1995 | Schwertfeger et al. | 244/118.5 |
| 5,577,358 A * | 11/1996 | Franke | 52/238.1 |
| 5,589,958 A * | 12/1996 | Lieb | 349/16 |
| 5,651,733 A * | 7/1997 | Schumacher | 454/76 |
| 5,677,603 A | 10/1997 | Speirs et al. | |
| 5,784,836 A * | 7/1998 | Ehrick | 52/79.8 |
| 6,000,659 A * | 12/1999 | Brauer | 244/118.6 |
| 6,007,025 A * | 12/1999 | Coughren et al. | 244/118.6 |
| 6,056,239 A * | 5/2000 | Cantu et al. | 244/118.6 |
| 6,059,364 A * | 5/2000 | Dryburgh et al. | 297/354.13 |
| 6,079,669 A * | 6/2000 | Hanay et al. | 244/118.5 |
| 6,101,766 A * | 8/2000 | Mogensen | 52/34 |
| 6,152,400 A * | 11/2000 | Sankrithi et al. | 244/118.5 |
| 6,257,523 B1 * | 7/2001 | Olliges | 244/118.5 |
| 6,398,164 B1 | 6/2002 | Fasse | |
| 6,493,128 B1 * | 12/2002 | Agrawal et al. | 359/265 |
| 6,604,709 B1 * | 8/2003 | Wentland et al. | 244/118.5 |
| 6,615,421 B2 * | 9/2003 | Itakura | 4/664 |
| 6,669,141 B2 * | 12/2003 | Schmidt-Schaeffer | 244/118.6 |
| 6,691,952 B2 * | 2/2004 | Keogh | 244/118.5 |
| 6,857,689 B2 * | 2/2005 | Dodgen | 296/156 |
| 6,938,284 B2 * | 9/2005 | Kitade et al. | 4/664 |
| 2003/0189132 A1 * | 10/2003 | Brady et al. | 244/118.5 |
| 2005/0001097 A1 * | 1/2005 | Saint-Jalmes | 244/118.6 |
| 2005/0001098 A1 * | 1/2005 | Saint-Jalmes | 244/118.6 |

FOREIGN PATENT DOCUMENTS

| | | |
|---|---|---|
| EP | 0 850 834 | 7/1998 |
| FR | 917 909 | 1/1947 |
| FR | 2 256 857 | 8/1975 |
| FR | 2 303 711 | 10/1976 |
| FR | 2 426 608 | 12/1979 |

* cited by examiner

AIRCRAFT CABIN MODULE

This invention relates to a cabin module for an aircraft.

Present-day aircraft offer different classes of comfort for their passengers and the crew members. Accordingly, there are more or less comfortable seats (reclining backs, seats with a support provided for the legs, seats convertible into a bed, etc . . . ). The space allotted to each passenger itself also is greater or lesser depending on the class.

Travelers thus may enjoy a considerable sleeping-arrangement comfort but do not have, as is the case, for example, in a sleeper train, an enclosed private space.

This is explained by the safety constraints that exist on board an aircraft. Among these constraints, the following will be noted. The passengers must take off and land in seated position, in the direction of movement of the airplane or in the opposite direction. In addition, during these stages of take-off and landing, the crew, itself also settled sitting on a seat positioned longitudinally in relation to the movement of the airplane, must be able to keep an eye on most of the passengers, in particular to see that everything is going well and that, for example, no passenger stands up during these stages of take-off and landing.

To date, therefore, it has been thought that the implementation of individual compartments for one or more passengers was not suitable for an aircraft.

The purpose of this invention, however, is to provide a cabin module for an aircraft making it possible to re-create a space comparable to a compartment such as exists in sleeper trains. Of course, such a module must meet the safety standards established for civil aviation.

To this end, it proposes an aircraft cabin module of an elongated rectangular shape comprising:

two large walls connected by two small walls, a door mounted in an opening implemented in a wall separating the module from an aisle, at least one seat having at least one configuration in which it is positioned longitudinally in relation to the direction of movement of the aircraft, each module comprising elements capable of forming a bedding surface for at least one passenger.

Such a module is compatible with the constraints existing in an aircraft, with respect to size as well as safety.

Such a module advantageously is equipped with a service module arranged along a small wall. In such a module according to the invention, the service module preferably is arranged next to the door for access to the module.

In a first embodiment of a module according to the invention, one seat in each personal space is of a convertible type and constitutes the said elements capable of forming the bedding surface. In this case, the seat advantageously is set up pivoting around a vertical axis in such manner that the bedding surface can be positioned crosswise.

In another embodiment, the elements capable of forming a bedding surface comprise, for example, a panel set up pivoting between a more or less vertical position turned up against the bathroom area and a more or less horizontal turned-down position. In this other embodiment, the elements capable of forming a bedding surface further comprise, for example, a more or less horizontal support surface arranged along the cabin wall and cooperating with the pivoting panel when the latter is in turned-down position to form the bedding surface. It can be provided that this support surface forms a seat possibly equipped with a back.

In a variation of embodiment, a second seat is provided in the module. This second seat can be a foldaway or other seat. A corner seat can be arranged between the two seats in order to connect them and thus form a corner banquette.

To allow a member of the crew to see inside the module, in particular during the stages of take-off and landing and when the module is intended for a passenger, at least one wall of the module advantageously comprises a transparent portion. This transparent portion preferably is installed on a wall transverse in relation to the direction of movement of the aircraft.

The transparent portions implemented in the module walls preferably can be obscured. Thus, during the stages of take-off and landing, the transparent portions remain transparent, and during cruising, these portions are obscured. A preferred embodiment provides that at least one transparent portion comprises a liquid crystal layer combined with means for subjecting this liquid crystal layer to a difference of electric potential, this layer being opaque or translucent depending on the difference of potential applied. In another embodiment at least one transparent portion is equipped with a shade or similar element.

The service module is, for example, a bathroom facility having at least one water source, for example a washbasin or a shower. The bathroom facility can comprise a washbasin set up movable between a retracted position inside the bathroom facility and an extended position outside the bathroom facility. In this case, the bathroom facility preferably has an access door and the opening of this door for access to the bathroom facility advantageously controls the changeover of the washbasin from its retracted position to its extended position.

The service module also can be a storage space, or else a medical-care module, or else a pantry unit equipped for the passengers' refreshment, or . . . etc. This module can be intended for the use of the passengers traveling in the cabin module, or of the commercial flight personnel, or even of third parties (physicians, . . . ).

The walls other than the cabin wall, the service module and the seat at least one in number are preferably each equipped with fastening means for their attachment on longitudinal attachment rails arranged in the floor of the cabin. Such rails almost always are provided in airplanes intended for the transport of passengers in order to make possible the attachment of seats. The fastening means used for the elements making up a module according to the invention will be, for example, the same as those customarily used for the attachment of seats, with a possible adaptation.

By way of example, a module according to the invention has a length ranging between 1.9 m and 3.0 m and a width on the floor, in the transverse direction, ranging between 1.4 m and 2.1 m.

This invention also relates to a series of modules such as described hereinabove, aligned one beside the other along an aisle, characterized in that each module wall, possibly except for a large wall located at one end of the series of modules, comprises a transparent portion and in that the transparent portions are aligned.

In such a series, the said seat of each module of the series having a configuration in which it is positioned parallel to the aisle preferably is more or less in alignment with the transparent portions.

This invention also relates to an aircraft cabin section, characterized in that it comprises at least one module such as described above. This aircraft cabin section comprises, for example, a central aisle on either side of which there is at least one module each time.

Finally, this invention relates to an aircraft, characterized in that it comprises at least one module according to the invention.

Details and advantages of the invention will emerge more clearly from the description which follows, presented with reference to the attached schematic drawing, on which.

Figure 1:
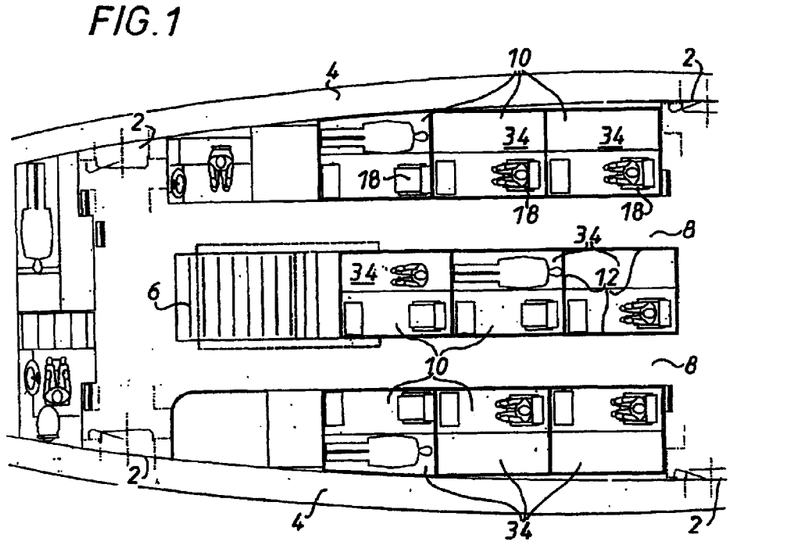
FIGS. 1 to 5 show, in a view from above, a set of cabin modules according to the invention in various configurations.
Figure 2:
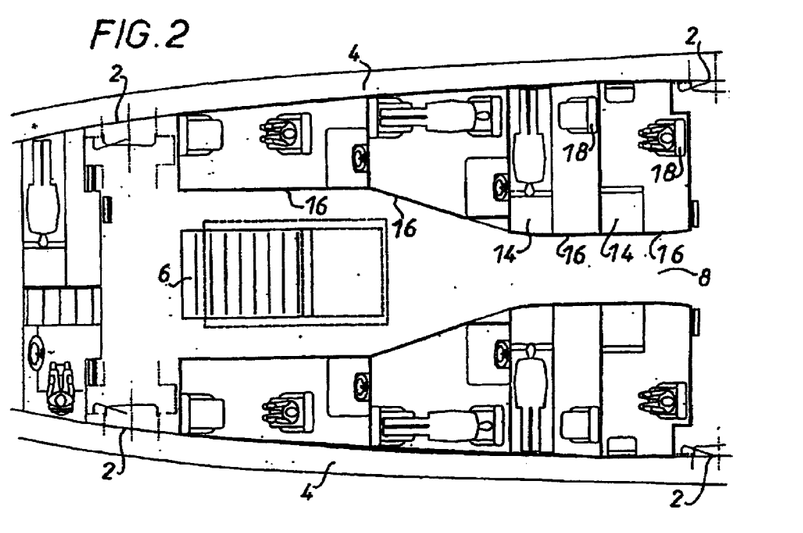
Figure 3:
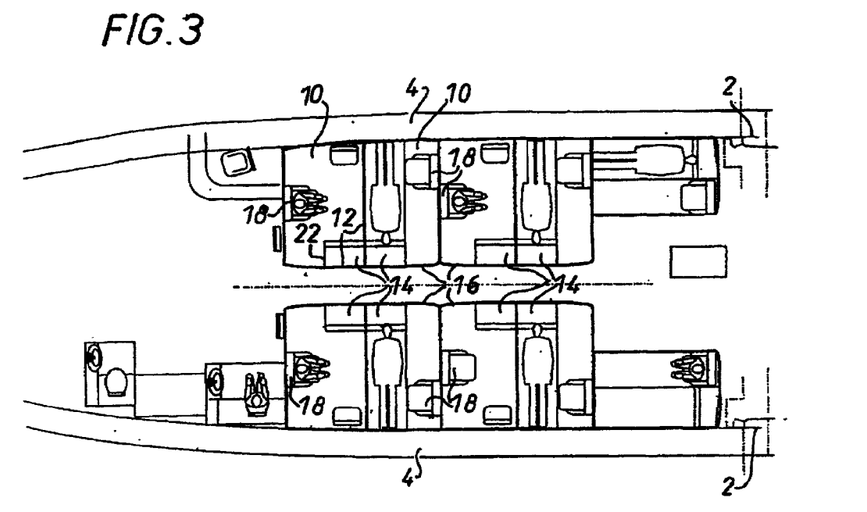
Figure 4:
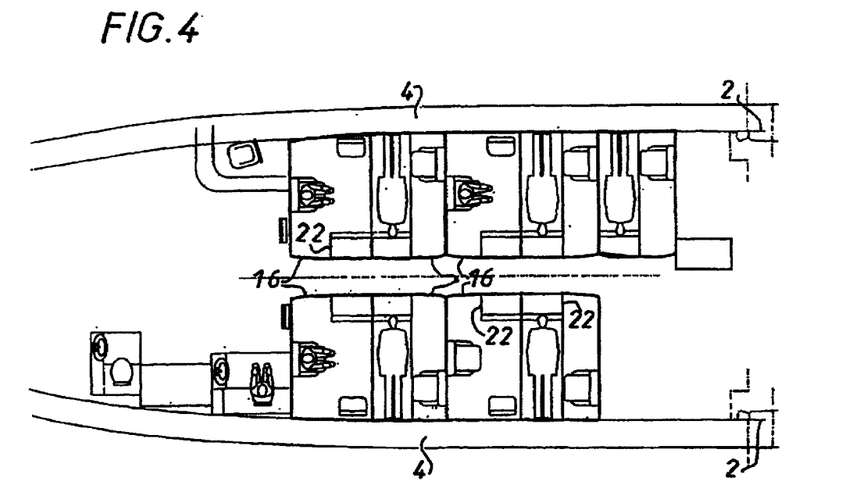
Figure 5:
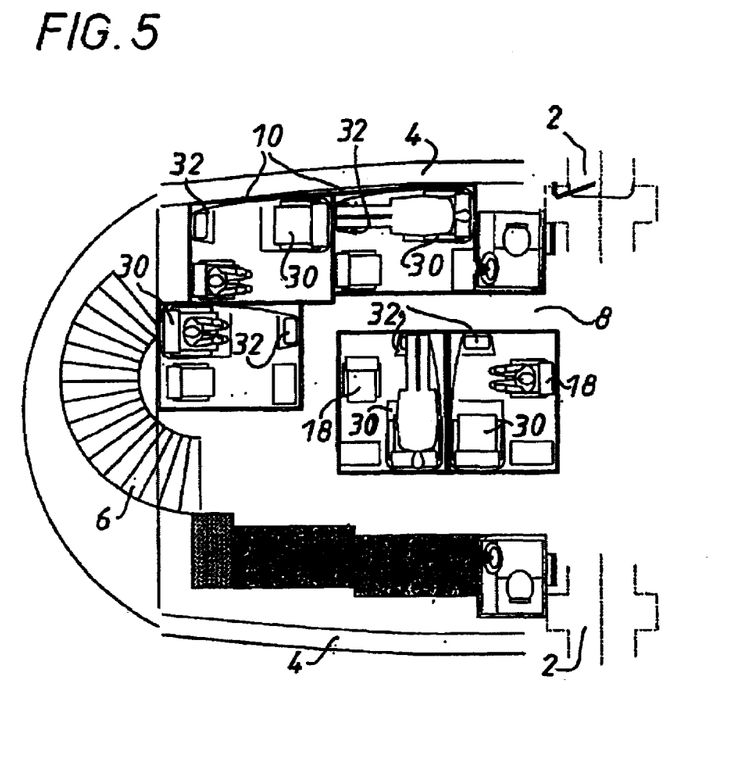

FIGS. 1 to 5 depict schematically the habitable space of an airplane cabin section. In the case of FIGS. 1 and 2, this section is located longitudinally between 2 successive emergency exits. In the case of FIGS. 3 to 5, this section is located at one end of the airplane, and therefore only two emergency exits 2 are depicted in these Figures. Each time, a longitudinal cabin wall 4 delimits this space on both sides of the airplane. Windows (not depicted) possibly are implemented in each cabin wall 4.

The airplane the sections of which are depicted here is an airplane having an upper deck and a lower deck. Thus there is seen in FIGS. 1, 2 and 5 a staircase 6, straight (FIGS. 1 and 2) or curved (FIG. 5), which makes it possible to go from one deck to another. The configurations of the sections depicted can be located on the upper deck or on the lower deck. This invention, of course, also relates to airplanes having only one level, which is the case for most of the airplanes currently in service.

In each configuration depicted, an aisle 8 extends longitudinally in relation to the cabin section. Each time, on either side of this aisle 8, there are modules 10 each intended to accommodate a passenger and possibly a visitor or else a member of the crew. In FIG. 1, two aisles 8 are implemented. There then are three rows of modules 10, each row extending in the longitudinal direction: one row along each cabin wall 4 and a row in alignment with the staircase 6. In FIG. 2, the aisle 8 is arranged in a central position and has a Y-shape at staircase 6. FIGS. 1 and 2 correspond here to the same cabin section, but fitted out in a different manner. In FIGS. 3 and 4, there is a single central longitudinal aisle 8, while in FIG. 5 the aisle 8 is angled.

The width of the aisle 8 is, for example, approximately 0.75 m and its length is adapted according to the configuration selected. As for itself, each module 10 has, for example, a length ranging between 2.00 m and 3.00 m and a width, for example, ranging between 1.40 m and 2 m. The general shape of a module is rectangular, but it is noted, for example in FIG. 2, in which the aisle 8 has a Y-shape, that in order to fit the shape of the aisle 8, or of another element of the airplane, a cabin wall can be sloping, bent or curved.

Figure 6:
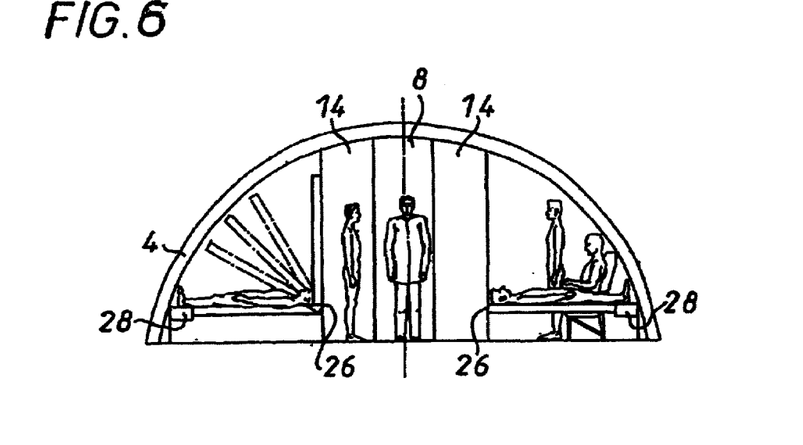
FIG. 6 shows schematically in cross section the airplane cabin section of FIG. 3, and FIGS. 7, 8, and 9 show in perspective three embodiments of a cabin module according to the invention. The embodiment shown in FIG. 9 is from the upper deck.
Figure 7:
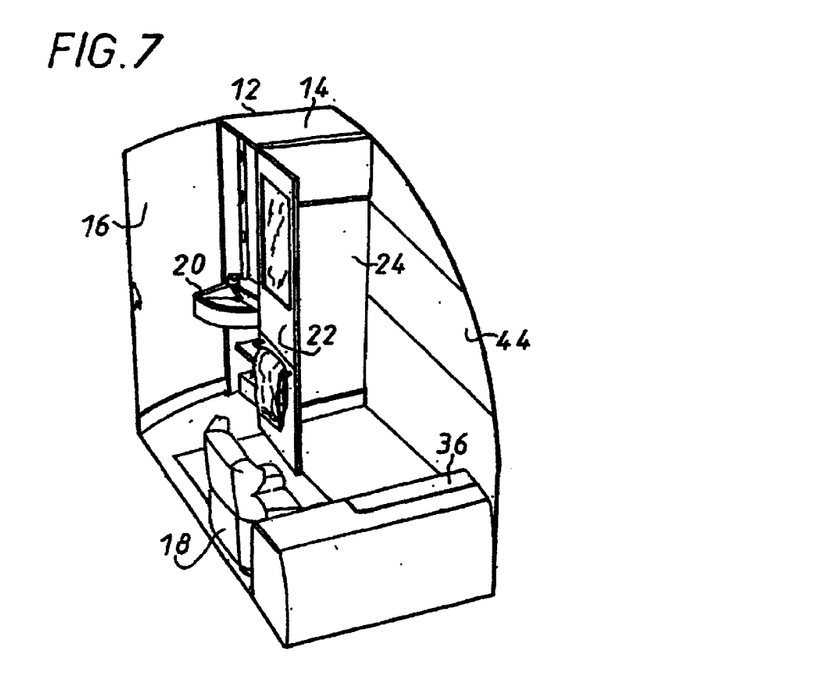
Figure 8:
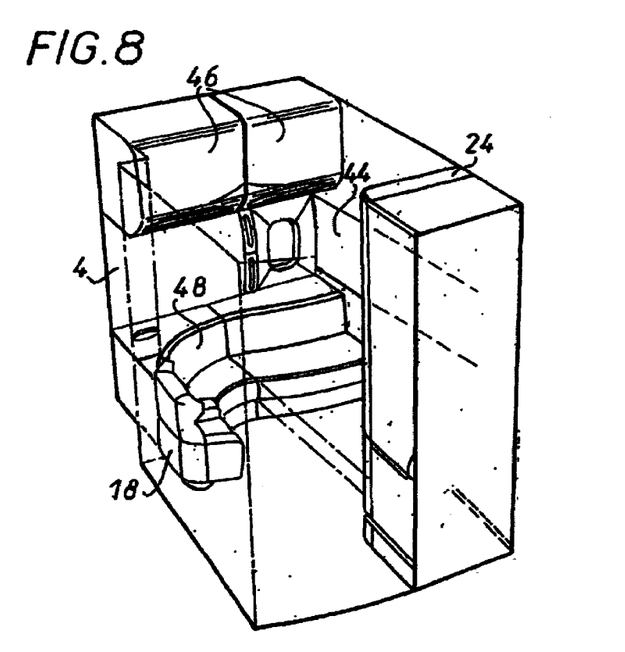
Figure 9:
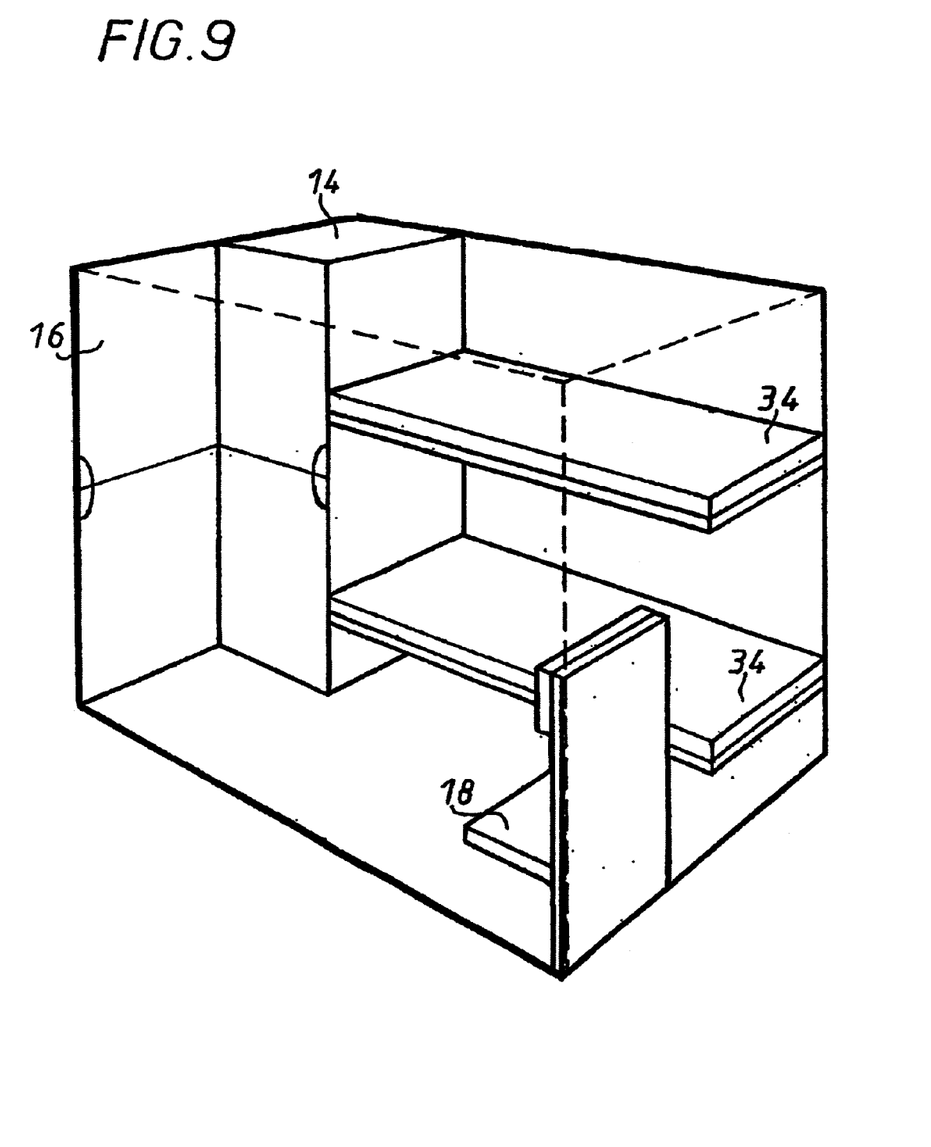

Each module 10 is delimited on the one hand by a floor corresponding to the floor of the cabin and by a ceiling, and on the other hand by two longitudinal walls and two transverse walls. In certain cases, the ceiling can consist of the cabin wall 4, because the latter is of circular cylindrical shape. As already indicated, the Figures in the drawing depict modules 10 inside a long mail airplane having two decks. FIGS. 6 and 7 depict modules located on the upper deck, while FIGS. 8 and 9 depict a module 10 located on the lower deck. In the modules situated on the upper deck, the ceiling follows the shape of the cabin section which is rounded, the cabin section being of a general circular cylindrical shape.

The transverse (in the direction of the width of the module 10) walls and the longitudinal (in the direction of the length of the module 10) walls can correspond to a cabin wall 4 or to a partition 12 separating the module 10 from the corresponding aisle 8 of an adjacent module 10.

Each module 10 also is equipped with a seat 18, possibly pivoting, and with means making it possible to implement a bedding surface. Certain modules 10 also are equipped with a service module 14 (FIGS. 3, 4, 7 and 8). When the dividing wall of the module with the corresponding aisle 8 is a transverse wall of the module, this service module 14 then preferably is arranged along the aisle 8. The module 10 then is accessed from the aisle 8 by a door 16 arranged beside the service module 14, each time between the latter and a longitudinal wall of the module.

Each service module 14 is of an overall parallelepipedal shape and extends from the floor to the ceiling of the module 10 in which it is located. Each service module 14 is, for example, equipped with a washbasin 20 (FIG. 7) and thus constitutes a lavatory for the passenger in the module. Access to the lavatory is via a door 22 (FIG. 7) implemented in a transverse wall of the lavatory.

Bedding means are present in each module, but they are implemented in various manners. In the case in which the module 10 is equipped with a service module, each bed depicted is, for example, as shown in FIGS. 3, 4, 6 to 8, implemented in two parts. A first part 24 is set up pivoting around a horizontal axis 26 (FIG. 6) and a second stationary part 28 is arranged, in the embodiment shown in FIGS. 3 and 4, along the cabin wall 4. The first part 24 pivots between a turned-up vertical position along the longitudinal wall of the service module 14 situated inside the module 10 and a turned-down horizontal position in which it extends from the service module 14 to the cabin wall 4 up to the stationary part 28. The stationary part 28 of the bed also can be used, when the first pivoting part 24 is in its turned-up position, as a seat for a visitor (FIG. 8 for example).

The bedding means also may be formed by a seat convertible into a bed. Thus, the modules of FIG. 5 comprise a first seat 18 and a second seat 30 which may be used to form a bed. In the embodiment depicted, the seat 30 cooperates with a footrest 32 to form a more or less horizontal surface intended to accommodate a passenger. The seat 30 comprises, for example, a mechanism making it possible to bring the back of the seat into a more or less horizontal position.

Another embodiment of the bedding means is to provide merely a stationary bed 34 as depicted for the modules 10 of FIG. 1. This bed then extends, for example, along a longitudinal wall of the module, for example over the entire length of the latter, as depicted in FIG. 1. In a variation of embodiment, depicted in FIG. 9, two stationary beds 34 are provided stacked. In the case of an airplane with two decks, this configuration is better suited to the modules of the lower deck. In FIG. 9, in a variation of the embodiment depicted in FIG. 1, each stationary bed 34 is arranged along a longitudinal wall of the module between a service module 14 and the opposite transverse wall.

In each module 10, there is a seat 18, possibly pivoting, in order to allow the passenger to settle into a seated position while facing in the direction of movement or in the opposite direction, in particular for the stages of take-off and landing of the airplane. When the seat is pivoting, it can be positioned according to the desire of the passenger during flight. In FIG. 5, a seat 18 of a central module has been depicted in a longitudinal position in relation to the movement of the airplane, while in the adjacent module 10, the seat 18 has been depicted in a transverse position.

FIG. 7 shows in perspective, with more details, a first example of interior layout of a module 10. It relates to a module different from those depicted in FIGS. 1 to 6. The same references, however, are used to designate similar elements.

Thus there is seen in this module 10 a service module 14 (which here is a lavatory) arranged along a partition 12 separating the module 10 from an access aisle and beside a door 16, a pivoting seat 18 and a bed in two parts. FIG. 7 also depicts a divider partition 12 with an adjacent module 10. One partition and the cabin wall have not been depicted in this FIG. 7 in order to make it possible to better visualize the interior of the module 10. A divider partition 12 with another adjacent module 10 possibly can be removable. It then becomes possible to create a dual module capable of accommodating two passengers, providing a larger available space, in particular when the beds are in a folded-back position against the service module.

The bed is of a configuration slightly different from that described in reference to FIG. 6. There is seen here a pivoting part 24 turning up in a vertical position against the service module 14, cooperating with another part 36 to form the bed. In this scenario, the other part 36 of the bed likewise is pivoting. It pivots around a horizontal axis parallel to the axis 26 of pivoting of the pivoting part 24 which is more or less longer than the complementary part 36. This part 36 of the bed can serve as a foldaway seat when the pivoting part 24 of the bed is turned up against the service module 14. It thus constitutes a second available seat inside each module 10.

The lavatory here is equipped with a folding washbasin 20. When the access door 22 of the module 10 to the lavatory is closed, the washbasin 20 is turned up vertically in the lavatory and when the door 22 is opened, the washbasin 20 can be turned down and assumes a horizontal position, extending outside the lavatory. The passenger using the washbasin 20 thus has more space because he does not have to go inside the lavatory.

When the module 10 is intended for a passenger, and not for the commercial flight personnel or the pilots, the partitions 12 separating two modules 10 advantageously all are equipped with a transparent portion 44 thus making it possible for a member of the airplane crew to see what is going on in the module 10, in particular during the stages of take-off and landing of the airplane. This transparent portion 44 is in the form of a horizontal strip centered at approximately ⅔ of the height of the divider partition 12. When several modules 10 are aligned, as can be seen in FIGS. 1 to 4, provision is made to align the transparent portions 44 so that a member of the crew seated in line with the modules can see inside each one of the latter and thus attend to the safety of the passengers located in the modules, in particular during the stages of take-off and landing of the airplane. During these stages, the passengers are settled in a seat positioned longitudinally in relation to the direction of movement of the airplane (and equipped with a seat belt). The transparent portions 44 then are positioned on the partitions 12 so as to see these seats, at least in part. There is an alignment, therefore, between these portions 44 and the seats 18 intended to accommodate the passengers during the stages of take-off and landing.

For a partition 12 located at the end of a line-up of modules 10, it can be pointless to provide a transparent portion 44 or else even in the case of an isolated module, only one transparent portion 44 can be contemplated. In practice, however, it usually is preferable to have a transparent portion 44 on all the partitions 12 when the modules 10 are intended for passengers.

During flight, these transparent portions are able to be made opaque or obscured. Different means can be used to this end. For example, provision can be made for shades, blinds, shutters, or similar elements. Each passenger in his module then can choose to obscure or not to obscure the transparent wall 44 of his personal space. In a preferred embodiment, the transparent portions 44 comprise a liquid crystal layer and means making it possible to subject this layer to a difference of electric potential. These liquid crystals have the property of becoming opaque when they are positioned in a certain manner, this positioning being obtained by electric excitation. During the stages of take-off and landing, the transparent portions 44 are such that the crew can see the passengers inside the modules, while during the rest of the flight these transparent portions are made opaque.

FIG. 8 shows another possibility for layout of a module 10. In the case of this format, as indicated above, the module 10 is situated on the lower deck of the airplane. The cabin wall 4 then is approximately vertical. Provision then can be made for baggage compartments 46 in the top portion of the cabin wall 4. It also is possible to make provision for storage space in the service module 14 or else along the cabin wall 4 in low position.

The seat 18 intended to accommodate the passenger during the stages of take-off and landing is not pivoting here, but remains stationary. It is supplemented by a corner seat 48 and by the portion of the bed arranged on the cabin wall 4 side to form a corner banquette.

In all these variations of embodiment described hereinabove, the various elements making up each module 10 (the partitions 12, the seats, the service module 14, etc . . . ) are fastened to the floor on attachment rails. Used here are the attachment rails which are provided for the attachment of seats in every airplane intended for transport of passengers. A series of longitudinal rails is provided throughout the width of the cabin. Regularly spaced anchoring points (usually every inch, or with a distance of 2.54 cm) along each rail are provided for attachment of the seats. The means of attachment for the various elements making up the modules are identical to those classically used for the fastening of seats on the rails.

This invention is not limited to the embodiments described hereinabove by way of nonrestrictive examples. It also relates to all the variations of embodiment within the reach of the individual skilled in the art, in the context of the claims hereinbelow.

Thus, for example, numerous outfitting variations can be provided in the modules.

The seat intended to accommodate the passenger during the stages of take-off and landing and arranged longitudinally during these stages can be, for example, a seat convertible to a bed. In the case of this format, it then is not necessary to provide a separate bedding surface. This seat also can be moved around in the module. It was seen above that this seat could pivot, but provision also can be made so that it can be moved.

The description presented hereinabove is given with reference to an airplane comprising two decks, which implies for each deck an under-ceiling height for each deck which is limited. Accordingly, the embodiments described provide for a bed in two parts. With a greater under-ceiling height, however, having a folding bed with a sole part also could be contemplated.

The layout of the service module can be different from what is described hereinabove. It can be planned to equip this service module to make it into a bathroom area by providing a washbasin as indicated in the description, but it also, or alternatively, can be equipped with a shower and/or a WC. This service module also may be simply a storage area, accessible from the inside of the module or from the outside of the latter. In the case of an airplane for repatriation on medical grounds, the service module can be used to house medical equipment. This service module also can be equipped with a pantry unit for preparing hot meals and/or drinks. Numerous other uses also can be provided.

The invention claimed is:

1. An aircraft cabin module of elongated rectangular shape comprising:
    two first walls connected by two second walls smaller than the first walls,
    a door mounted in an opening implemented in a wall separating the module from an aisle;
    at least one seat having at least one configuration in which it is positioned longitudinally in relation to a direction of movement of the aircraft;
    the module comprising elements configured to form a bedding surface for at least one passenger,
    wherein both of the two second walls are arranged transversely to a direction in which the aircraft is configured to move, and each of the two second walls arranged transversely includes a transparent portion, respectively, and
    the transparent portions of the two second walls and the at least one seat are aligned with each other longitudinally in relation to the direction of movement of the aircraft.

2. A module according to claim 1, further comprising a service module arranged along one of the second walls.

3. A module according to claim 2, wherein the service module is arranged beside the door.

4. A module according to claim 1, wherein the at least one seat is of a convertible type and constitutes the elements configured to form the bedding surface.

5. A module according to claim 4, wherein the at least one seat is set up pivoting around a vertical axis.

6. A module according to claim 1, wherein the elements configured to form a bedding surface comprise a panel set up pivoting between a more or less vertical turned-up position against the service module and a more or less horizontal turned-down position.

7. A module according to claim 6, wherein the elements configured to form a bedding surface further comprise a more or less horizontal support surface arranged along the opposite small wall and cooperating with the pivoting panel when the pivoting panel is in the turned-down position to form the bedding surface.

8. A module according to claim 7, wherein the support surface forms a seat equipped with a back.

9. A module according to claim 1, further comprising a second seat provided in the cabin module.

10. A module according to claim 9, further comprising a corner seat that connects the at least one seat and the second seat thus forming a corner banquette.

11. A module according to claim 1, wherein the transparent portion is configured to be obscured.

12. A module according to claim 11, wherein the transparent portion comprises a liquid crystal layer combined with means for subjecting the liquid crystal layer to a difference of electric potential, the layer being opaque or translucent depending on the difference of electric potential applied.

13. A module according to claim 1, wherein the transparent portion is equipped with a shading element.

14. A module according to claim 2, wherein the service module is a bathroom facility having at least one water source.

15. A module according to claim 14, wherein the bathroom facility comprises a washbasin set up movable between a retracted position inside the bathroom facility and an extended position outside the bathroom facility.

16. A module according to claim 15, wherein the bathroom facility has an access door, and opening of the access door controls changeover of the washbasin from its retracted to its extended position.

17. A module according to claim 2, wherein the service module is a storage space.

18. A module according to claim 2, wherein the service module is a medical-care module.

19. A module according to claim 2, wherein the service module is a pantry unit equipped for passengers' refreshment.

20. A module according to claim 1, wherein the walls other than the cabin wall, the service module, and the seat at least one in number are each equipped with fastening means for their attachment on longitudinal attachment rails arranged on the floor of the cabin.

21. A module according to claim 1, wherein the module has a length in a longitudinal direction ranging between 1.9 m and 3.0 m and a width on the floor, in a transverse direction, ranging between 1.5 m and 2.1 m.

22. A series of modules, each module according to claim 1, wherein the seat of each module of the series has a configuration in which the seat is positioned parallel to a direction of movement of the aircraft.

23. A section of an aircraft cabin, wherein the section comprises at least one module according to claim 1.

24. A section of an aircraft cabin according to claim 23, wherein the section comprises a central aisle on either side of which is at least one module.

25. An aircraft, comprising at least one module according to claim 1.

26. A module according to claim 1, wherein the transparent portion is configured to provide a line of sight into the module to permit crew members outside the module to see inside the module during take-off and landing.

27. A series of modules according to claim 22, wherein the transparent portions in each of said modules are configured to provide a line of sight into each of the modules to permit crew members outside the modules to see inside each of said modules along said line of sight.

* * * * *